May 21, 1957 — H. J. FLAIR — 2,792,636
BROACH CHECKING MACHINE
Filed March 9, 1956 — 3 Sheets-Sheet 1

INVENTOR.
Henry J. Flair
BY Olson & Trexler
Attys.

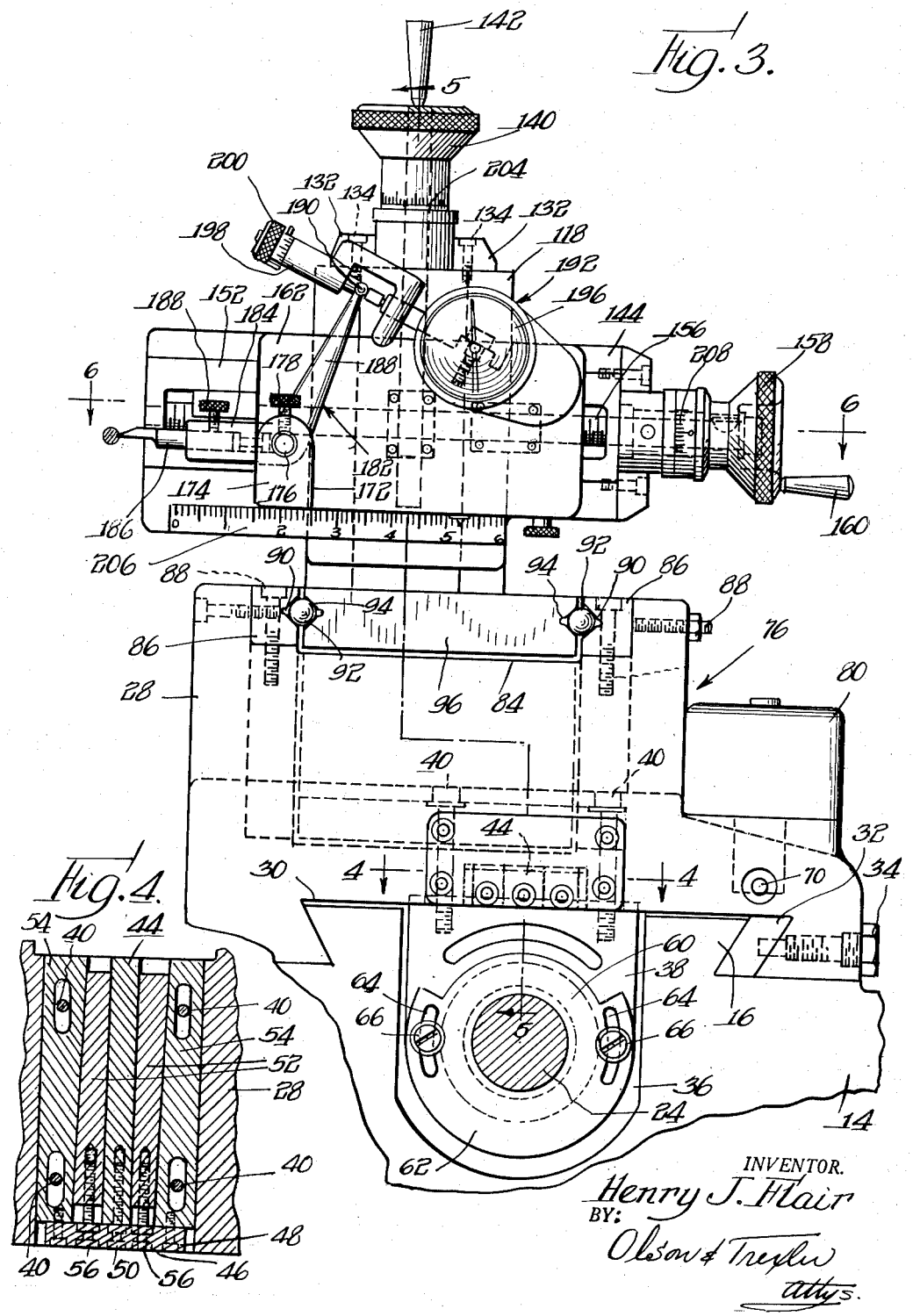

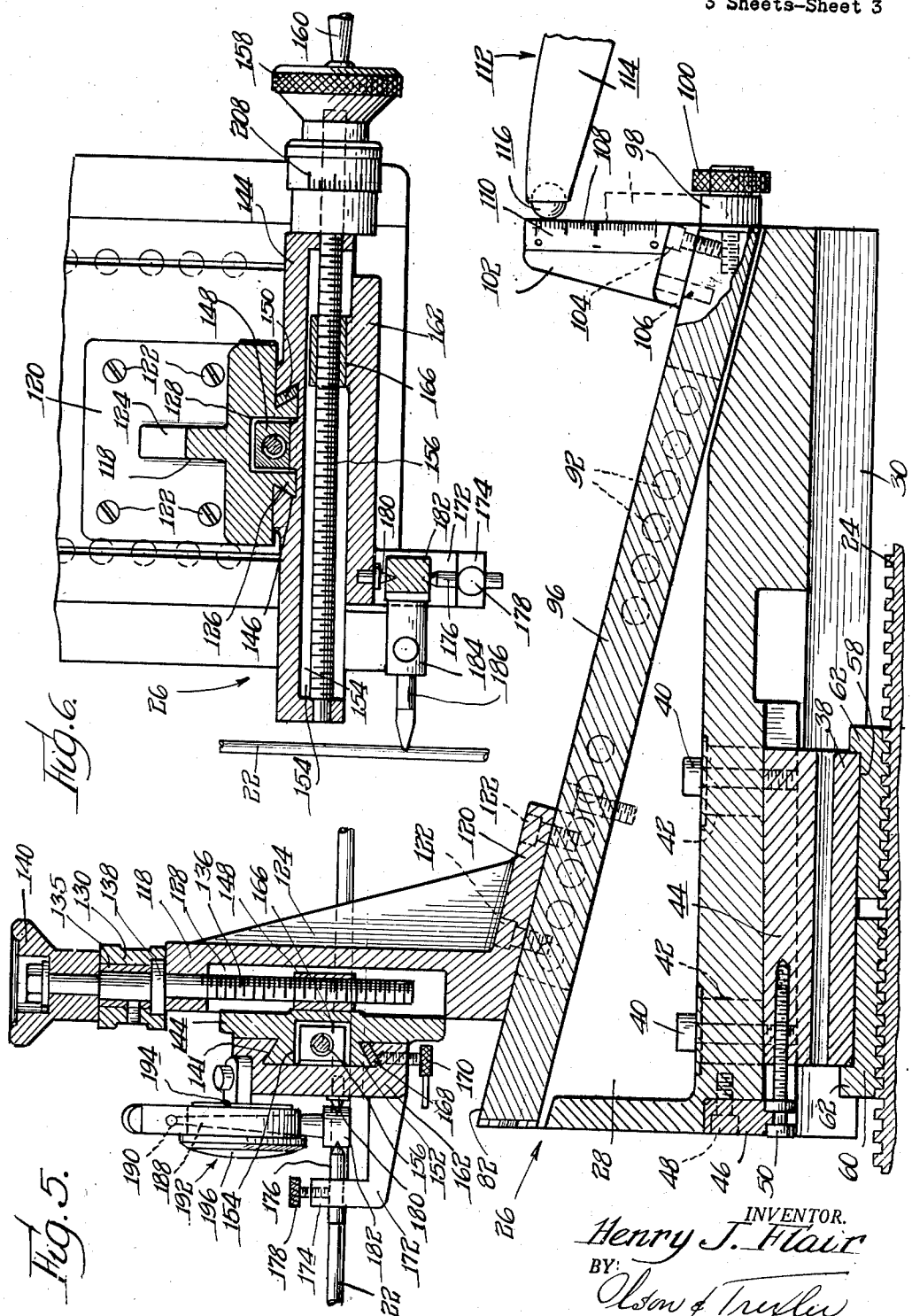

United States Patent Office 2,792,636
Patented May 21, 1957

2,792,636
BROACH CHECKING MACHINE
Henry J. Flair, Chicago, Ill., assignor to Illinois Tool Works, Chicago, Ill., a corporation of Illinois Application March 9, 1956, Serial No. 570,473
6 Claims. (Cl. 33—179.5)

This invention is concerned with a testing machine, more specifically a machine for inspecting helical broaches.

Analytical inspection machines capable of measuring lead, involute, and spacing of broaches to determine whether these measurements fall within prescribed standards of accuracy usually check only one of these elements or measurements. Ordinarily, three machines would be required to check the elements of lead, spacing, and involute of a broach. Many ingenious methods and apparatus have been used in the past for obtaining the requisite motions for checking the above noted elements. Such methods and apparatus generally have served satisfactorily for the analytical inspection of gears, but they have had serious drawbacks when used for checking helical spline broaches.

The well known sine bar is often used for producing linear motion accurately related to rotary motion. However, the sine bar fails when it is necessary, as in helical spline broach inspection, to have more than 360° rotation, or large linear movements.

Change gear machines have been developed, utilizing ground helical master gears for providing spindle rotation at a speed proportional to axial movement, when used in conjunction with a lead screw. However, they are limited to approximately a six to one ratio and have the inherent angular velocity errors that exist even in the most accurate ground gears. Furthermore, when minimum proportions are used for the pinion, the mating part becomes too large for accurate grinding. Such a machine is sensitive to the character of tooth engagement as well as to the spacing, involute, lead, and center distance. While machines of this type function well on short leads where all ratios are favorable, they become quite inaccurate when used for leads of any magnitude.

Accordingly, it is an object of this invention to provide a new and improved machine for checking or inspecting helical spline broaches.

A further object of this invention is to provide a helical broach measuring machine capable of measuring the magnitude of errors of the elements of lead, involute, and spacing.

It is a further object of this invention to provide a checking head for an otherwise more or less conventional measuring machine for measuring the magnitude of errors of lead, involute, and spacing.

Other and further objects and advantages of the present invention will be apparent from the following description when taken in connection with the accompanying drawings wherein:

Fig. 3 is an end view of the checking head as taken from the left side of Fig. 2;

Fig. 4 is a detail view in horizontal section taken along the line 4—4 of Fig. 3;

Fig. 5 is a vertical sectional view through the checking head as taken substantially along the line 5—5 in Fig. 3; and Fig. 6 is a horizontal sectional view through the checking head as taken along the line 6—6 in Fig. 3.

Figure 1:
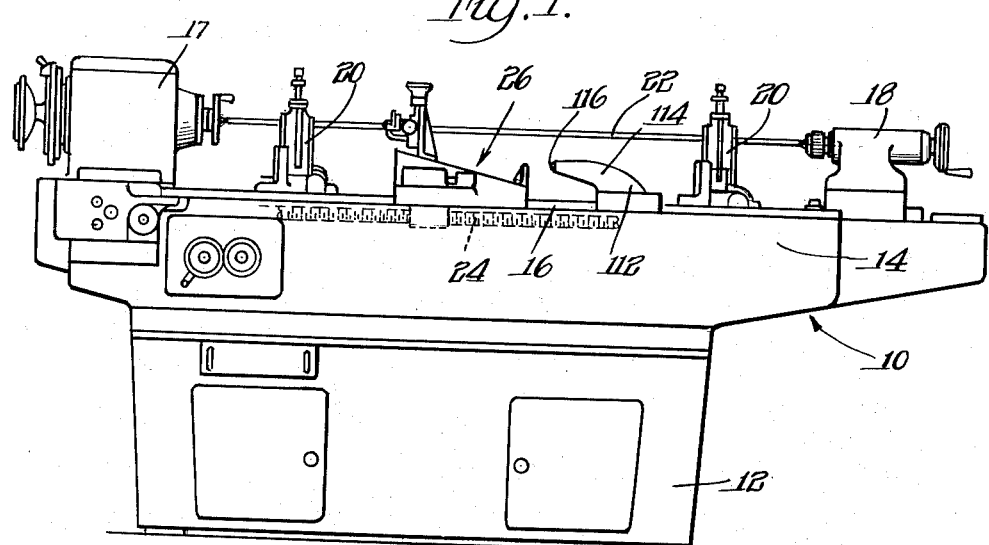
Fig. 1 is an elevational view of a machine constructed in accordance with the principles of the invention.
Figure 2:
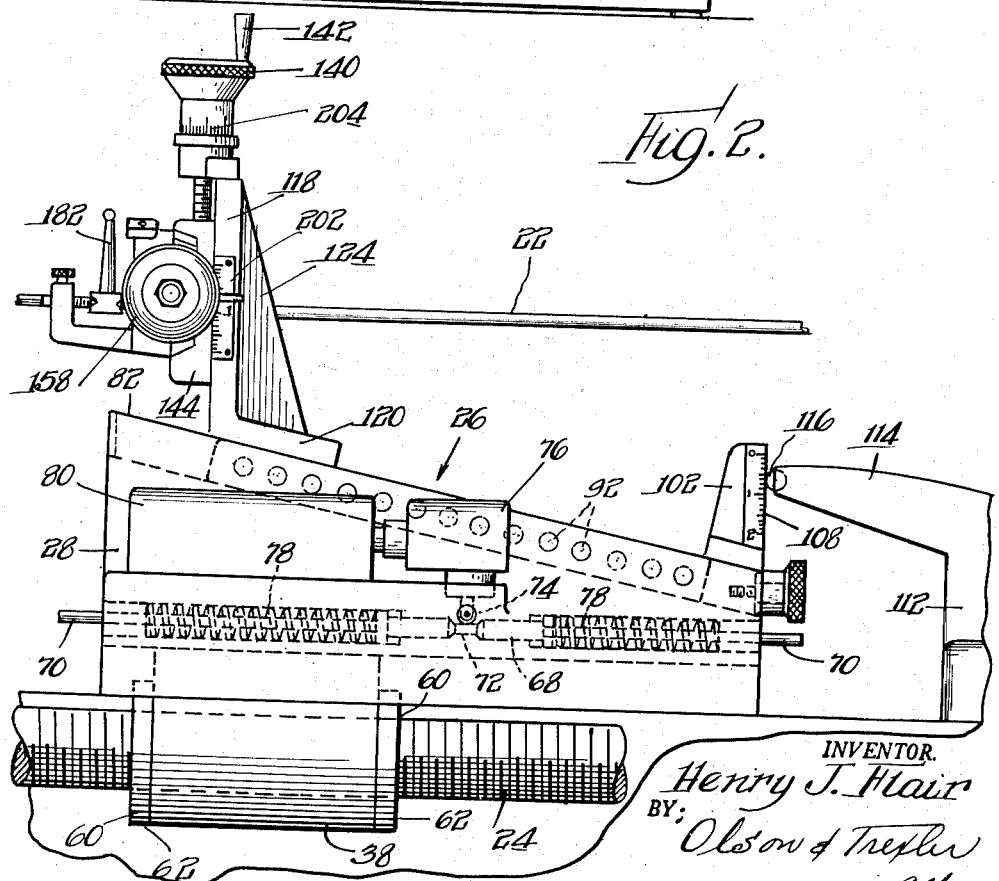
Fig. 2 is an enlarged elevational view of the checking head.

Referring now in greater particularity to the drawings, and first to Figs. 1 and 2, there will be seen a testing machine identified generally by the numeral 10 and comprising a base 12 housing suitable controls and an amplifier and recording apparatus. The base is provided at its top with a dove tail bed 14 having an upstanding dove tail guide 16 on the top thereof. A motor driven head stock 17 is provided at one end of the bed, and this head stock also can be driven by hand for setting up or starting an operation, as is more or less in accordance with conventional practice. A tail stock 18 is provided adjacent the opposite end of the bed, and steady rests 20 are adjustably spaced along the bed for supporting a helical spline broach 22. A lead screw 24 is provided in the bed below the dove tail guide 16, and this lead screw is driven in synchronism with the head stock 17 from a common power source. Preferably, the head stock incorporates gearing of the type shown in Saari Patent No. 2,696,125. This gearing provides extreme accuracy, and high reduction ratios. In a particular embodiment of this invention, the gearing used in the head stock has a 120:1 ratio and has eight teeth in simultaneous contact.

A checking or testing head 26 is mounted on the bed 14 for movement therealong. More specifically, the checking head includes a lower slide 28 having a dove tail groove 30 (Figs. 3 and 5) in the lower surface thereof and receiving the dove tail 16 of the bed. A gib 32 is provided in one side of the dove tail groove, and adjusting screw means 34 is provided therefor in order to provide a proper fit at all times.

The bed 14 and dove tail 16 thereof are provided with a longitudinal slot 36 (Fig. 3) and a fixture 38 depends into this slot from the lower slide 28. This fixture is held against the underside of the lower slide by means of bolts 40 passing loosely through slots 42 in portions of the lower slide and threaded into the fixture 38.

The fixture 38 is provided with an upstanding central rib 44 (Figs. 3–5). The upper surface of the rib 44 is tapered, as is the confronting surface of the lower slide. Longitudinal adjustment of the fixture 38 relative to the lower slide thus effects raising and lowering of the fixture for proper cooperation with the feed screw as will be more apparent hereinafter. A plate 46 is held across a recess in the end of the lower slide by means such as screws or bolts 48, and a screw 50 passes through this plate along the bottom edge thereof, and is held against longitudinal movement relative to the plate. Thus, when the screw is threaded in or out of a complementary tapped bore in the rib 44 it effects the aforementioned longitudinal movement of the fixture relative to the lower slide.

Wedges 52 are positioned on opposite sides of the rib 44, and have their tapered outer edges engaging complementary surfaces in an insert 54 in the lower slide. Longitudinal movement of these wedges is controlled by screws 56 passing through the lower edge of the plate 46 and threaded into the wedges. Longitudinal movement of these wedges effects transverse shifting of the fixture 38 for effecting proper lateral alignment of the fixture with the lead screw. It will be understood that the bolts 40 are loosened whenever any adjustment of the fixture 38 is to be made.

The depending fixture 38 is provided with a cylindrical, longitudinally extending bore 58 (Fig. 5). A pair of elongated nut members 60 is received in this bore.

The nut members are provided with internal threads receiving the lead screw 24, and each nut member is provided at its outer end with a radially extending flange 62. The flanges are provided with opposed arcuate slots 64, and screws or bolts 66 pass through these slots and thread into the depending fixture 38. Loosening of the screws 66 and rotation of one or both of the nut members a few degrees insures that one of the nut members will bear against one face of the threads of the lead screw 24, while the other nut member will bear against the opposite face. As a result, backlash is eliminated.

A rod 68 (Fig. 2) extends completely through the testing head lower slide and projects from the opposite ends thereof as is indicated at 70. The central portion of this rod is provided with a restriction 72, and a roller 74 on the end of an actuator for a switch mechanism 76 is received in this restriction. Opposed helical springs 78 normally centralize the rod 68. However, should the testing head tend to travel too far in either direction the appropriate projecting end 70 thereof would engage a fixed part to shift the rod longitudinally, and thereby to actuate the switch mechanism 76 to turn off the machine. The switch mechanism 76 is mounted and wired in conjunction with an electrical control unit 80 including push button means for starting, stopping, and reversing the machine. The switch mechanism and control mechanism both are of well known construction, and elaboration thereon accordingly is unnecessary.

The upper portion of the lower slide 28 is inclined at a shallow angle to the horizontal as is indicated at 82, and is provided with a longitudinal recess 84. The recess 84 is provided along its opposite longitudinal edges with bearing races 86 (Fig. 3) suitably held in place by screws or bolts 88. The bearing races 86 are provided with confronting V-shaped ball grooves 90, and a plurality of bearing balls 92 is rollingly received in these grooves and in confronting V-shaped grooves 94 of an upper slide 96. A stop 98 normally extends across the bottom of the upper slide to limit the downward movement thereof. This stop is held in place by a bolt having a knurled knob 100 thereon, and upon loosening of this bolt the stop can be swung to the raised position shown in dashed lines in Fig. 5, thereby freeing the upper slide for downward movement.

An upstanding stop 102 is provided and is fixed to the lower portion of the upper slide by means such as one or more bolts 104 and suitable dowels 106 passing through flanges on the stop 102 and extending into the upper slide. The stop 102 is provided with a vertical edge 108, and a scale 110 having indicia thereon is mounted immediately adjacent this vertical edge.

A fixed involute head stop 112 (Figs. 1, 2 and 5) is mounted so as to be adjustably fixed in position on top of the bed 14, as by interfitting with the dove tail 16 and having suitable clamping means to lock it in place. The head stop is provided with a longitudinally extending arm or finger 114 having a ball 116 rotatably received in the tip thereof. This ball is adapted to engage the vertical edge 108 of the stop 102. Thus, when the upper slide is released for up or down movement relative to the lower slide, and the vertical edge 108 engages the ball 116 upon longitudinal feeding of the testing head by the screw 24, the lower slide will raise or lower the upper slide in the manner of a sine bar.

An upstanding bracket 118 (Figs. 2, 3, 5 and 6) is mounted on the upper slide 96 near the upper end thereof. The bracket 118 has a lower flange 120 inclined at the same angle to the horizontal as the top 82 of the lower slide and the top of the upper slide. Bolts 122 pass through this flange, and are threaded into the upper slide. A vertical web 124 of triangular configuration braces the bracket 118.

The bracket 118 is provided on its front face with a vertical dove tail 126 having a vertical groove or recess 128 therein extending back into the main portion of the bracket. A collar 130 having lateral ears 132 (Fig. 3) thereon is secured on top of the bracket by screws 134 passing through the ears. The collar is provided with a bearing 135, and a screw is mounted in the bearing and extends down into the vertical groove or recess 128. The screw, hereinafter identified by the numeral 136, is provided with a circumferential flange 138 preventing vertical movement of the screw. A knurled handle 140 is provided at the upper end of the screw, and is provided with a crank handle 142.

A vertical slide 144 is mounted for up and down movement on the bracket 118, and includes a dove tail guideway 146 receiving the dove tail slide 126. The guideway is provided with a nut 148 suitably fixed to the vertical slide, and this nut threadedly cooperates with the screw 136 for raising and lowering the vertical slide. A gib 150 is interposed between the dove tail slide 126 and groove 146. A screw or bolt (not shown) for adjustment of the gib is provided, as will be understood.

The vertical slide 144 is provided with a horizontal dove tail slide 152 having a horizontal groove or recess 154 therein. A screw 156 extends through this recess and is journaled at the opposite ends thereof in the vertical slide. The right end of the screw (as viewed in Fig. 6) is provided with a knurled knob 158 having a crank handle 160 thereon. The knob is secured on the screw, and the screw is fixed against axial movement in much the same manner as was described with regard to the screw 136, namely by means such as a bolt on the upper end of the screw, or a cap screw threaded into a tapped bore in the upper end of the screw, and by a collar having laterally extending lugs thereon through which screws are threaded into the end of the vertical slide.

A horizontal slide 162 is provided with a horizontal dove tail slot or groove 164 receiving the horizontal dove tail 152 of the vertical slide. A nut 166 is suitably affixed to the horizontal slide and extends into the horizontal recess 154 of the vertical slide, and threadedly receives the screw 156 whereby to shift the horizontal slide horizontally upon rotation of the screw 156 by the knob 158. A gib 168 is interposed between the horizontal dove tail 152 and an adjacent wall of the horizontal dove tail groove 164, and an adjusting screw 170 is provided therefor.

An arm 172 extends from one side of the horizontal slide, and then upwardly as at 174. The upwardly extending portion carries a pivot 176 of the needle bearing type, and a clamp screw 178 adjustably secures the pivot 176 in place. A fixed pivot 180, also of the needle bearing type, is mounted in the side wall of the horizontal slide in alignment with the pivot 176.

A bell crank 182 is pivotally mounted between the pivots 176 and 180 and includes a generally horizontally extending arm or socket portion 184. A testing finger 186 is held in the socket portion by means of a clamping screw 188. The testing finger may be of a type known in the art for inspecting helical spline broaches. The bell crank 182 further is provided with an angularly upstanding arm 188 having a ball 190 at the upper end thereof.

A testing unit 192 is mounted on the side of the horizontal slide 162 by bracket means 194. The testing unit comprises a conventional movement indicating gauge or meter 196 having a linear differential transformer 198 of known design coupled thereto. A knurled knob 200 is provided at one end of the testing unit for adjusting the idle position thereof, and the ball 190 effects movement of the gauge and of the linear differential transformer. The gauge provides an instantaneous visual indication of errors in the broach being tested, while the linear differential transformer is connected to a pen mechanism for making a permanent record on a moving paper tape (not shown).

The vertical slide 144 and bracket 118 are provided with cooperating scale means 202 of a relatively coarse nature, and with rotary fine scale means 204 in conjunction with the knob 140. Similarly, cooperating scale means 206 (Fig. 3) is provided between the horizontal and vertical slides, and fine scale means 208 is provided in conjunction with the knob 158.

The knob 140 is used for setting the proper height of the vertical slide, and hence of the checking finger 186, above or below center relative to the broach 22 being tested. The scale means 202 and 204 indicate this height. The correct radius or checking depth is set by means of the knob 158, which effects horizontal movement of the horizontal slide, the position being read on the scales 206 and 208.

For checking lead the testing head 26 simply is fed along the bed of the machine by the lead screw 24 in accordance with conventional practice, and in timed relation with rotation of the broach 22 under test by virtue of the synchronizing gears. Reaction of the broach on the testing finger 186 causes this finger to move up or down in accordance with errors. Such errors are indicated instantaneously on the gauge 196, and a permanent record thereof is made on the moving paper tape (not shown).

When it is desired to test for errors in involute, the locking mechanism 98, 100 is released to allow more or less independent movement of the upper slide 96 relative to the lower slide or testing head base 28. The fixed involute head stop 112 is locked in proper position, and the feed screw 24 advances the testing head until the ball 116 of the stop 112 engages the vertical edge 108 of the stop or follower arm 102. This limits the upper slide against further horizontal movement, and as the lower slide continues to advance under the influence of the feed screw 24, the upper slide moves vertically upwardly due to the enforced relative angular sliding movement on the lower slide. This movement is akin to that effected by the well known sine bar mechanism. The extent of vertical movement is measured by the scale 110.

Spacing errors are measured by indexing the broach one tooth at a time while moving the checking or testing head parallel to the broach axis by means of the lead screw 24.

It is to be understood that the specific example of the invention herein shown and described is set forth by way of illustration only. Various changes in structure will no doubt occur to those skilled in the art, and such changes are to be understood as being within the contemplation of this invention insofar as they fall within the spirit and scope of the appended claims.

The invention is claimed as follows:

1. In a machine for testing helical spline broaches having broach supporting and rotating means, a bed extending parallel to a broach supported by said broach supporting means, and feeding means operating in timed relation with said broach rotating means, a testing head comprising a base, said base having slide means thereon inclined at an acute angle to said bed, cooperating slide means movable relative to said base and interfitting with the first mentioned slide means, testing means engageable with a broach, means carrying said testing means from the second mentioned slide means for effecting movement of said testing means toward and away from said bed and means for moving said testing means toward and away from the broach and substantially parallel to said bed, and means mounted on said bed and engageable with the second mentioned slide means for effecting sliding thereof upon movement of the base along the slide whereby to produce movement of the testing means perpendicular to said bed.

2. A testing head as set forth in claim 1 and further including means for securing the two slide means together for movement as a unit.

3. In a machine for testing helical spline broaches having broach supporting and rotating means, a bed extending parallel to a broach supported by said broach supporting means, and feeding means operating in timed relation with said broach rotating means, a testing head comprising a base, means mounting said base on said bed for movement therealong, means operatively interconnecting said base and said feeding means for feeding said base along said bed in timed relation to rotation of a broach rotated by said broach rotating means, said base having inclined slide means thereon forming an acute angle with said bed, second slide means interfitting with said first mentioned slide means and slidable therein at said acute angle relative to said bed, testing means engageable with a broach, means supporting said testing means from said second mentioned slide means, and a stop mounted on said bed and engageable with said second mentioned slide means for effecting movement thereof relative to said base to produce movement of said testing means perpendicular to said bed in response to movement of said base along said bed.

4. A testing head as set forth in claim 3 wherein the testing means supporting means comprises a bracket mounted on the second mentioned slide means, means mounted on said bracket for movement thereon substantially perpendicular to said bed, and means mounted on the last mentioned means and movable relative thereto parallel to the bed and substantially perpendicular to the broach.

5. A machine for testing helical spline broaches as set forth in claim 1, wherein said testing means consists of a bell crank testing element having one end thereof engageable with a broach, pivot means pivotally supporting the bell crank testing element substantially at the apex thereof, means engaged by the other end of said bell crank testing element for interpreting movement thereof in accordance with errors in the broach, and means supporting said pivot means from said second slide means.

6. A machine for testing helical spline broaches as set forth in claim 1, wherein said broach rotating means consists of a worm and worm gear unit, said worm gear being of a face type worm gear cooperable with a worm made from a conical blank of moderate taper, the ratio being in excess of 9 to 1.

References Cited in the file of this patent

UNITED STATES PATENTS

| | | |
|---|---|---|
| 2,046,506 | Drader | July 7, 1936 |
| 2,336,845 | Christensen | Dec. 14, 1943 |
| 2,563,000 | Bean | Aug. 7, 1951 |